US010742785B2

(12) United States Patent
Shin et al.

(10) Patent No.: US 10,742,785 B2
(45) Date of Patent: Aug. 11, 2020

(54) MOBILE TERMINAL

(71) Applicant: LG ELECTRONICS INC., Seoul (KR)

(72) Inventors: Choonghwan Shin, Seoul (KR); Byunghwa Lee, Seoul (KR); Jungki Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/747,430

(22) PCT Filed: Jun. 8, 2016

(86) PCT No.: PCT/KR2016/006062
§ 371 (c)(1),
(2) Date: Jan. 24, 2018

(87) PCT Pub. No.: WO2017/022941
PCT Pub. Date: Feb. 9, 2017

(65) Prior Publication Data
US 2018/0219985 A1   Aug. 2, 2018

(30) Foreign Application Priority Data

Aug. 4, 2015   (KR) .................... 10-2015-0110012

(51) Int. Cl.
*H04M 1/02*   (2006.01)
*G06F 3/041*   (2006.01)
*G06F 3/01*   (2006.01)

(52) U.S. Cl.
CPC ............ *H04M 1/026* (2013.01); *G06F 3/016* (2013.01); *G06F 3/0414* (2013.01);
(Continued)

(58) Field of Classification Search
CPC ............ H04M 1/026; H04M 2250/12; H04M 2250/22; H04M 1/0266; H04M 1/0277;
(Continued)

(56) References Cited

U.S. PATENT DOCUMENTS 6,963,039 B1 * 11/2005 Weng ............... H01H 23/06
                                                    200/302.1
8,080,284 B2 * 12/2011 Shi ................... H05K 9/0045
                                                    427/259
(Continued)

FOREIGN PATENT DOCUMENTS

CN   102193679   9/2011
CN   102687100   9/2012
(Continued)

OTHER PUBLICATIONS

European Patent Office Application Serial No. 16833178.3, Search Report dated Dec. 7, 2018, 7 pages.

(Continued)

*Primary Examiner* — Yuwen Pan
*Assistant Examiner* — Paul P Tran
(74) *Attorney, Agent, or Firm* — Lee, Hong, Degerman, Kang & Waimey

(57) ABSTRACT

A mobile terminal is provided to address limitations of related art input systems. The mobile terminal includes a display unit, a support bracket including a support part configured to support a backside of the display unit and an extension part extending from the support part, a front window coupled with a front surface of the display unit and extension part, the front window including a rigid material, at least 3 front sensors located at the extension part of the support bracket, each generating a front force signal by receiving a front force applied to a prescribed point of the front window, and a controller measuring an applied point (Continued)

and magnitude of the front force through the front force signal generated by each of the at least 3 front sensors. When a force is applied, a location and magnitude of the force is measured and recognized as a classified input signal.

17 Claims, 18 Drawing Sheets

(52) U.S. Cl.
CPC ...... *H04M 1/0277* (2013.01); *H04M 2250/12* (2013.01); *H04M 2250/22* (2013.01)

(58) Field of Classification Search
CPC .............. H04M 1/0283; H04M 1/0249; G06F 1/04847; G06F 1/04883; G06F 1/04886; G06F 1/1601; G06F 1/1626; G06F 1/1633; G06F 1/1637; G06F 1/1643; G06F 1/1652; G06F 1/1656; G06F 1/169; G06F 3/016; G06F 3/0412; G06F 3/0414; G06F 3/0416; G06F 3/041; G06F 3/044; G06F 3/04847; G06F 3/0485; G06F 3/04883; G06F 3/04886; G06F 3/0488
USPC .............. 455/566; 345/173, 174; 361/679.26
See application file for complete search history.

(56) References Cited

U.S. PATENT DOCUMENTS

| | | | | |
|---|---|---|---|---|
| 9,760,241 B1* | 9/2017 | Lewbel | ............... | G06F 3/04812 |
| 2008/0117184 A1* | 5/2008 | Gettemy | ............... | G06F 1/1622 |
| | | | | 345/173 |
| 2009/0295753 A1* | 12/2009 | King | ..................... | G06F 1/1626 |
| | | | | 345/174 |
| 2010/0029339 A1* | 2/2010 | Kim | .................... | H04M 1/0266 |
| | | | | 455/566 |
| 2011/0151937 A1* | 6/2011 | Kusuda | ................. | G06F 1/1626 |
| | | | | 455/566 |
| 2011/0167391 A1* | 7/2011 | Momeyer | ............. | G06F 1/1684 |
| | | | | 715/863 |
| 2011/0227847 A1* | 9/2011 | Yoshiyama | ............. | G06F 3/044 |
| | | | | 345/173 |
| 2012/0032917 A1* | 2/2012 | Yamaguchi | ........... | G06F 3/0416 |
| | | | | 345/174 |
| 2012/0105358 A1 | 5/2012 | Momeyer et al. | | |
| 2013/0292237 A1* | 11/2013 | Arai | ...................... | G06F 3/0202 |
| | | | | 200/5 A |
| 2014/0132572 A1 | 5/2014 | Rusanen et al. | | |
| 2014/0320441 A1* | 10/2014 | Yamada | ................. | G06F 1/1643 |
| | | | | 345/173 |
| 2015/0043142 A1* | 2/2015 | Jang | ...................... | G06F 1/1652 |
| | | | | 361/679.26 |
| 2015/0135109 A1* | 5/2015 | Zambetti | ............... | G06F 3/0488 |
| | | | | 715/767 |
| 2016/0165027 A1* | 6/2016 | Hahn | ....................... | H04B 1/38 |
| | | | | 455/566 |

FOREIGN PATENT DOCUMENTS

| | | |
|---|---|---|
| CN | 104375573 | 2/2015 |
| EP | 2224313 | 9/2010 |
| JP | 2011100364 | 5/2011 |
| KR | 1020100106158 | 10/2010 |
| KR | 1020140040480 | 4/2014 |

OTHER PUBLICATIONS

PCT International Application No. PCT/KR2016/006062, Notification of Transmittal of the International Search Report and the Written Opinion of the International Searching Authority, or Declaration dated Aug. 30, 2016, 12 pages.

Chinese application No. 201680045028.4, Office Action dated Sep. 25, 2019, 12 pages.

* cited by examiner

MOBILE TERMINAL

CROSS-REFERENCE TO RELATED APPLICATIONS

This application is the National Stage filing under 35 U.S.C. 371 of International Application No. PCT/KR2016/006062, filed on Jun. 8, 2016, which claims the benefit of earlier filing date and right of priority to Korean Application No. 10-2015-0110012, filed on Aug. 4, 2015, the contents of which are all hereby incorporated by reference herein in their entirety.

BACKGROUND OF THE INVENTION

Field of the Invention

The present invention relates to a mobile terminal, and more particularly, to a mobile terminal having a force sensor.

Discussion of the Related Art

Generally, terminals can be classified into mobile/portable terminals and stationary terminals. In particular, the mobile terminals can be further classified into handheld terminals and vehicle mounted terminals according to possibility of user's direct portability.

Recently, functions of a mobile terminal tend to be diversified. For instance, the diversified functions include a function of data and audio communication, a function of photographing and video-making through a camera, a function of audio recording, a function of music file play through a speaker system, a function of outputting an image or video to a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be implemented as a multimedia player provided with complex functions such as photographing of photos or videos, playback of music or video files, game play, broadcast reception and the like for example.

To support and increase the terminal functions, it may be able to consider the improvement of structural parts and/or software parts of the terminal.

An inputting method of a terminal may include one of various methods such as a voice inputting method, a touch input method through a touchscreen or the like, an inputting method through a mechanical key, a method of using a specific signal sensed by a sensing unit as an input signal, and the like.

Particularly, a method of using a specific signal sensed by a sensing unit as an input signal may employ a force sensor. A force applied to a specific portion of a terminal is sensed and the sensed force can be then recognized as an input signal. If a specific point of a terminal is pressed, however, there exists no system capable of determining a location of the specific point and then sensing a magnitude of a force of the pressing.

In particular, in a mobile terminal having a display unit, an input signal may be generated through a touchscreen, a provided mechanical input unit, or a touch input unit. Yet, a terminal configured to use a specific portion or whole part of a body as an input region does not exist.

Accordingly, the present invention is directed to a mobile terminal that substantially obviates one or more of the problems due to limitations and disadvantages of the related art.

One object of the present invention is to provide a mobile terminal, by which a problem of limitations put on an input system in a related art terminal can be solved.

Technical tasks obtainable from the present invention are non-limited by the above-mentioned technical tasks. And, other unmentioned technical tasks can be clearly understood from the following description by those having ordinary skill in the technical field to which the present invention pertains.

SUMMARY OF THE INVENTION

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a mobile terminal according one embodiment of the present invention includes a display unit, a support bracket including a support part configured to support a backside of the display unit and an extension part extending from the support part, a front window coupled with a front surface of the display unit and the extension part, the front window including a rigid material, at least 3 front sensors located at the extension part of the support bracket, each generating a front force signal by receiving a front force applied to a prescribed point of the front window, and a controller measuring an applied point and magnitude of the front force through the front force signal generated by the each of the at least 3 front sensors.

According to another embodiment of the present invention, the mobile terminal may further include a main PCB seated on the backside of the support bracket and a flexible PCB connected to the main PCB, the flexible PCB including a first flexible PCB and a second flexible PCB having at least one of the at least 3 front sensors and the rest of the at least 3 front sensors, respectively.

According to another embodiment of the present invention, the at least 3 front sensors may be provided adjacent to a vertex of the front window.

According to another embodiment of the present invention, the mobile terminal may further include a tape bonding an edge of the front window and an edge of the extension part of the support bracket.

According to another embodiment of the present invention, the flexible PCB may include a seating surface having each of the front sensors seated thereon and may further include a buffer pad provided between the seating surface and the support bracket and an adhesive pad provided between the front window and the front sensor to fix a location of the front sensor.

According to another embodiment of the present invention, the flexible PCB may include a seating surface having each of the front sensors seated thereon and may further include a buffer pad provided between the seating surface and the support bracket and an adhesive pad provided between the front window and the front sensor to fix a location of the front sensor.

According to another embodiment of the present invention, the support bracket may include a front support part configured not to be displaced by the front force and a front tilting part connected to a first region of the front support part, the front tilting part configured to sag by the front force.

According to another embodiment of the present invention, the front support part and the front tilting part may be located in a same plane and the mobile terminal may further include a front slit provided to a second region between the front support part and the front tilting part except the first region.

According to another embodiment of the present invention, the front tilting part may include a metal material and one partial region of the front support part may include a polycarbonate material formed by molding to configure the front slit.

According to another embodiment of the present invention, the mobile terminal may further include a driving unit configured to generate vibration delivered to the front window. If the force is generated, the controller may control the driving unit to vibrate.

According to another embodiment of the present invention, the mobile terminal may further include a main PCB provided to a backside of the support bracket and an opening formed in the main PCB to expose the support bracket to a rear surface, wherein the driving unit may be seated on the support bracket by being installed in the opening.

According to another embodiment of the present invention, the front window may include a curved part having a curved edge of at least one side, a charged mold part charging a space between the curved part and the support bracket, the charged mold part configured to deliver a lateral force applied to a prescribed point of the curved part as a vertical force to the support bracket, at least one lateral sensor provided to a rear surface of the support bracket, the at least one lateral sensor configured to generate a lateral force signal by receiving the vertical force delivered to the support bracket, and a rear bracket provided to a rear surface of the at least one lateral sensor, the rear bracket configured to support the at least one lateral sensor.

According to another embodiment of the present invention, the two lateral sensors may be provided to both sides of the edge of the one side, respectively and wherein the controller measures a point from which the lateral force of the one side is generated and a magnitude of the lateral force of the point through a lateral force magnitude signal generated by each of the two lateral sensors.

According to another embodiment of the present invention, the mobile terminal may further include a lateral slit provided to each of both sides of a region of the support bracket corresponding to the at least one lateral sensor.

According to another embodiment of the present invention, the mobile terminal may further include a rear hosing, at least 3 rear sensors provided within the rear housing, each generating a rear force signal by receiving a rear force applied to a prescribed point of the rear housing, and an extension bracket configured to charge a backside space of the rear sensor to enable the at least 3 rear sensors and the rear hosing to come in contact with each other, wherein the controller may measure an applied point and magnitude of the rear force through the rear force signal generated from each of the at least 3 rear sensors.

It is to be understood that both the foregoing general description and the following detailed description are exemplary and explanatory and are intended to provide further explanation of the invention as claimed.

Accordingly, the present invention provides the following effects and/or features.

First of all, according to one embodiment of the present invention, an input function can be enabled by pressing a region other than a display unit or an additional input button of a mobile terminal.

Secondly, according to one embodiment of the present invention, when a force is applied, a location and magnitude of the applied force is measured and recognized as a classified input signal.

Thirdly, according to one embodiment of the present invention, disposition of parts can be efficiently performed in a manner of mounting a multitude of sensors on a single flexible PCB.

Fourthly, according to one embodiment of the present invention, sensitivity of a force sensor receiving a signal of a force input can be raised in a manner of enabling a predetermined displacement behavior by the force input.

Fifthly, according to one embodiment of the present invention, a complex input can be performed in a manner of sensing both a touch input and a force input to a point other than a display unit.

Sixthly, according to one embodiment of the present invention, a force input applied to an edge can be recognized as an input signal in a mobile terminal configured to have a curved edge of one side of a display unit.

Seventhly, according to one embodiment of the present invention, a sensing activity of a force sensor can be notified as a feedback to a user.

Finally, according to one embodiment of the present invention, a complex input combination can be achieved in a manner of receiving signals of force inputs applied to front and rear surfaces of a mobile terminal, respectively.

Effects obtainable from the present invention may be non-limited by the above mentioned effect. And, other unmentioned effects can be clearly understood from the following description by those having ordinary skill in the technical field to which the present invention pertains.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

The present invention will become more fully understood from the detailed description given herein below and the accompanying drawings, which are given by illustration only, and thus are not limitative of the present invention, and wherein.

DETAILED DESCRIPTION OF THE INVENTION

Figure 1A:
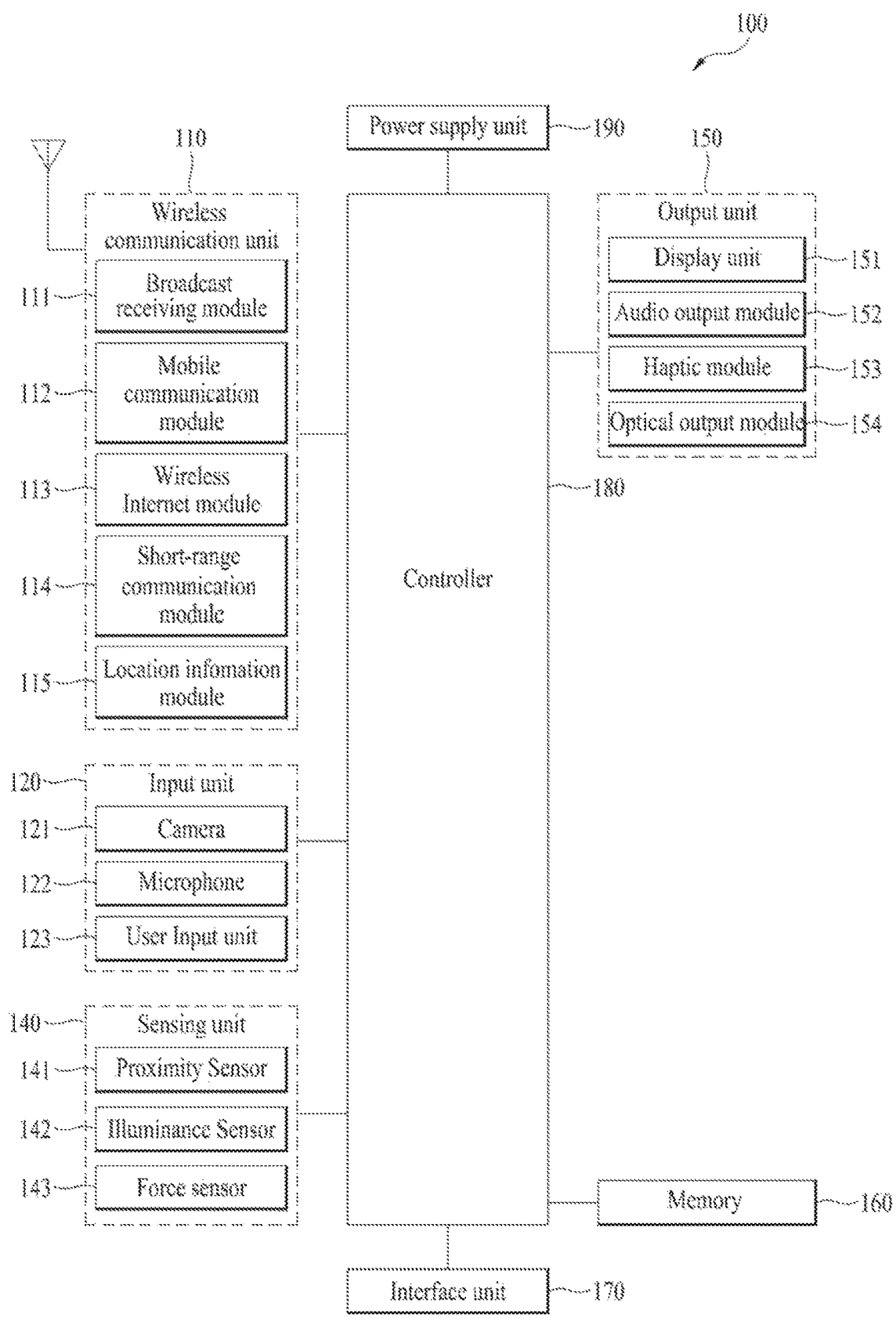
FIG. 1A is a block diagram to describe a mobile terminal according to the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
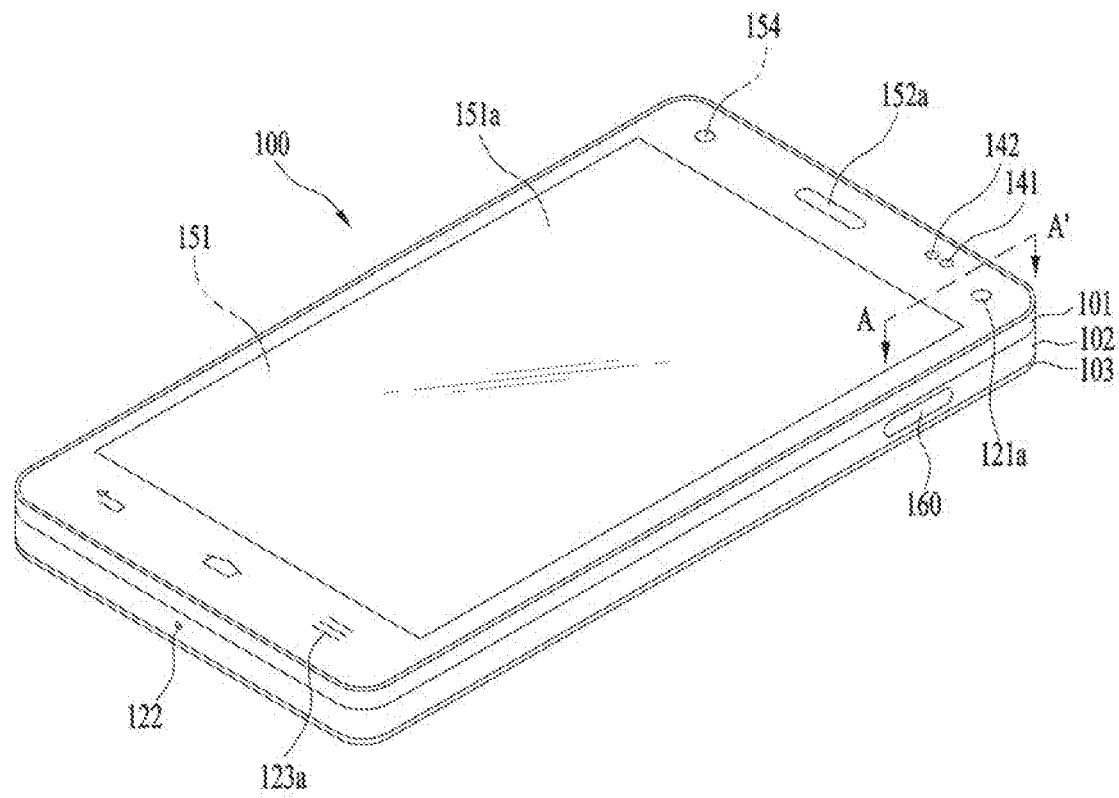
FIG. 1B and FIG. 1C are conceptual diagrams for one example of a mobile terminal according to the present invention viewed in different direction, respectively.
Figure 1C:
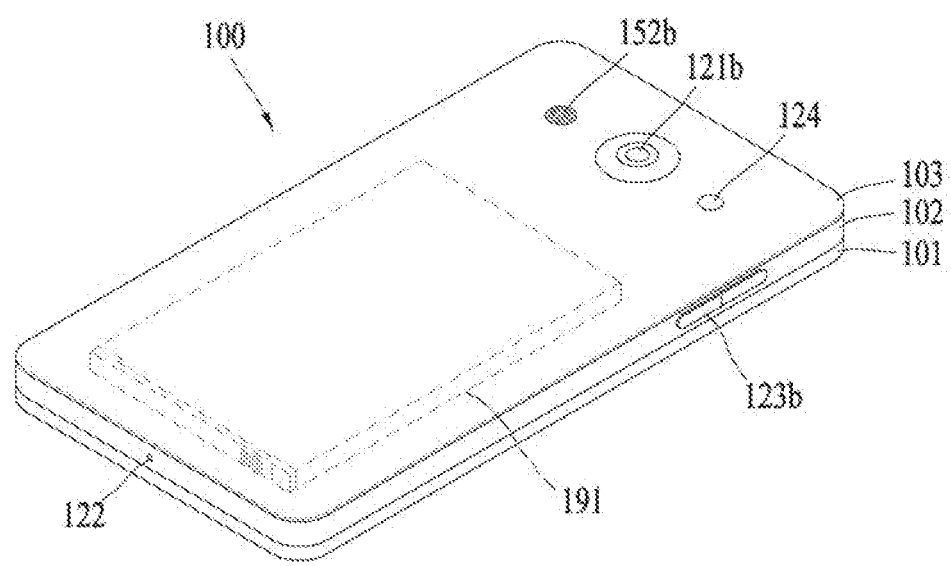

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless personal area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field or, infrared rays, or the like without a mechanical contact. The proximity sensor 141 may be arranged at an inner region of the mobile terminal covered by the touch screen, or near the touch screen. The proximity sensor 141 generally has a longer lifespan and enhanced utility, as compared to a typical contact sensor.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

A force sensor 143 may be used for the detection of a force generated from at least one point of the mobile terminal 100. As the force sensor 143 is attached to a force applied medium, if deformation occurs in the medium, the force sensor 143 can convert an amount of the deformation into an electrical signal.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

In a following description, the mobile terminal 100 including the display unit 151, the first audio output unit 152a, the proximity sensor 141, the illumination sensor 142, the optical output unit 154, the first camera 121a, the first manipulating unit 123a, the second manipulating unit 123b, the microphone 122, the interface unit 160, the second audio output unit 152b, and the second camera 121, as shown in FIG. 1B and FIG. 1C, is taken as one example. In particular, the display unit 151, the first audio output unit 152a, the proximity sensor 141, the illumination sensor 142, the optical output unit 154, the first camera 121a, and the first manipulating unit 123a are disposed on the front surface of the terminal body, the second manipulating unit 123b, the microphone 122, and the interface unit 160 are disposed on the lateral surface of the terminal body, and the second audio output unit 152b and the second camera 121 are disposed on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 displays (or, outputs) information processed in the mobile terminal 100. For instance, the display unit 151 can display a running screen information of an application program run in the mobile terminal 100 or UI/GUI (user interface/graphical user interface) information according to the running screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121*a* can process image frames such as still or moving images obtained by the image sensor in a capture mode or a video call mode. The processed image frames can then be displayed on the display unit 151 or stored in the memory 170.

The first and second manipulation units 123*a* and 123*b* are examples of the user input unit 123, which may be manipulated by a user to provide input to the mobile terminal 100. The first and second manipulation units 123*a* and 123*b* may also be commonly referred to as a manipulating portion, and may employ any tactile method that allows the user to perform manipulation such as touch, push, scroll, or the like. The first and second manipulation units 123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
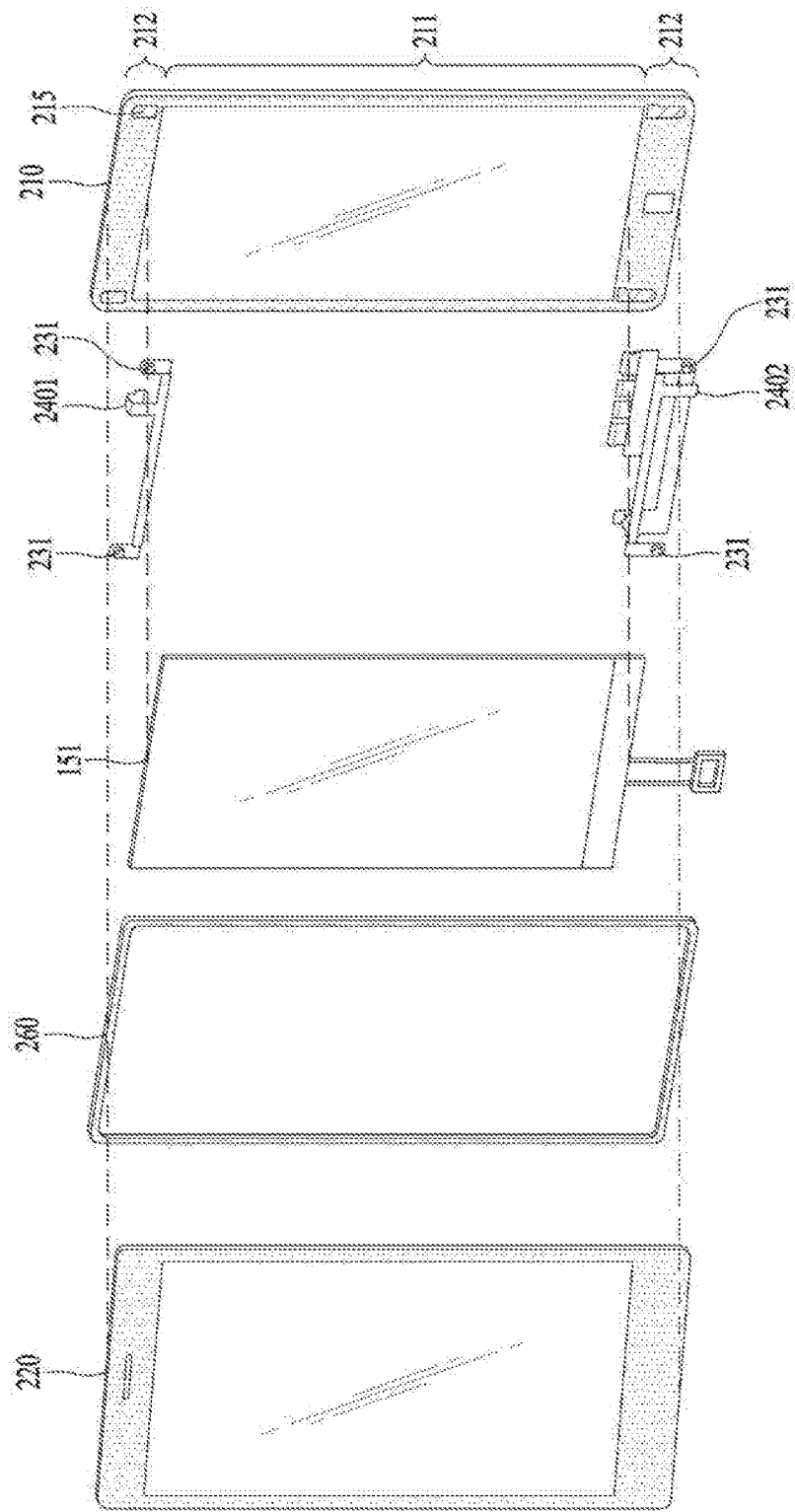
FIG. 2 is a diagram of a mobile terminal according to one embodiment of the present invention.

FIG. 2 is a diagram of a mobile terminal 100 according to one embodiment of the present invention.

Referring to FIG. 2, a support bracket 210 can be disposed on a backside of a display unit 151. The support bracket 210 can be divided into a support part 211 configured to support a backside of a display in direct and an extension part 212 corresponding to a region extending from the support part 211. In particular, the extension part 212 may indicate a region configured to be exposed when the display unit 151 is mounted on the support bracket 210. The extension part 212 may include a region extending in top and bottom directions of the display with reference to a front side of the mobile terminal 100, by which the present embodiment is non-limited. For instance, the extension part 212 may extend in one of the top and bottom directions or in right and left directions. Since a margin space is generally provided a little bit more in the top and bottom directions of the display unit 151 with reference to the front side of the mobile terminal 100, it may be advantageous for the extension part 212 to be provided in the top and bottom directions in aspect of spatial disposition.

The support bracket 210 may be formed of a single material or configured with at least two materials such as metal and poly carbonate if necessary. The configuration with metal and poly carbonate shall be described in the description of a front tilting part 215.

A front window 220 may be coupled with a front surface of the display unit 151 and the extension part 212 of the support bracket 210. The front window 220 may form a front exterior of the mobile terminal 100 entirely or in part. The front window 200 may be coupled with an edge of each of the display unit 151 and the extension part 212 of the support bracket 210. Alternatively, the front window 220 may be attached to each of the display unit 151 and the extension part 212 of the bracket 210 entirely through OCA (optically clear adhesive) film.

The front window 220 may be formed of a rigid material that satisfies predetermined rigidity. Such a rigid material may employ a normal glass, a tempered glass, or the like. In this case, the predetermined rigidity may be defined as follows. First of all, when a specific point of the front window 220 is pressed, a corresponding force is delivered to a plane of the front window 220 so that the whole front window 220 can be pressed by the force as well as the pressed specific point. As such rigidity is met, a front force sensor, which will be described later, is provided to the extension part 212 of the support bracket 210. Although a force input is generated in a manner that a user applies a force to the front window 220 in a region at which the display unit 151 is located, as the force is delivered to the plane of the front window 220, the corresponding force can be delivered to the front force sensor.

The front force sensor 231 is configured to generate a signal from distinguishing a level of a magnitude of a force generated from a contact surface. The front force sensor 231 may be located between the backside of the front window 220 and the extension part 212 of the support bracket 210. Since the front force sensor 231 should be able to deliver the force generated from the specific point of the front window 220, it is effective that the front force sensor 231 is located right on the backside of the front window 220. Yet, as the front force sensor 231 is unable to be located between the display unit 151 and the front window 220 by satisfying such a condition, it may be ideal that the front force sensor 231 is located at the extension part 212 of the support bracket 210.

Figure 3:
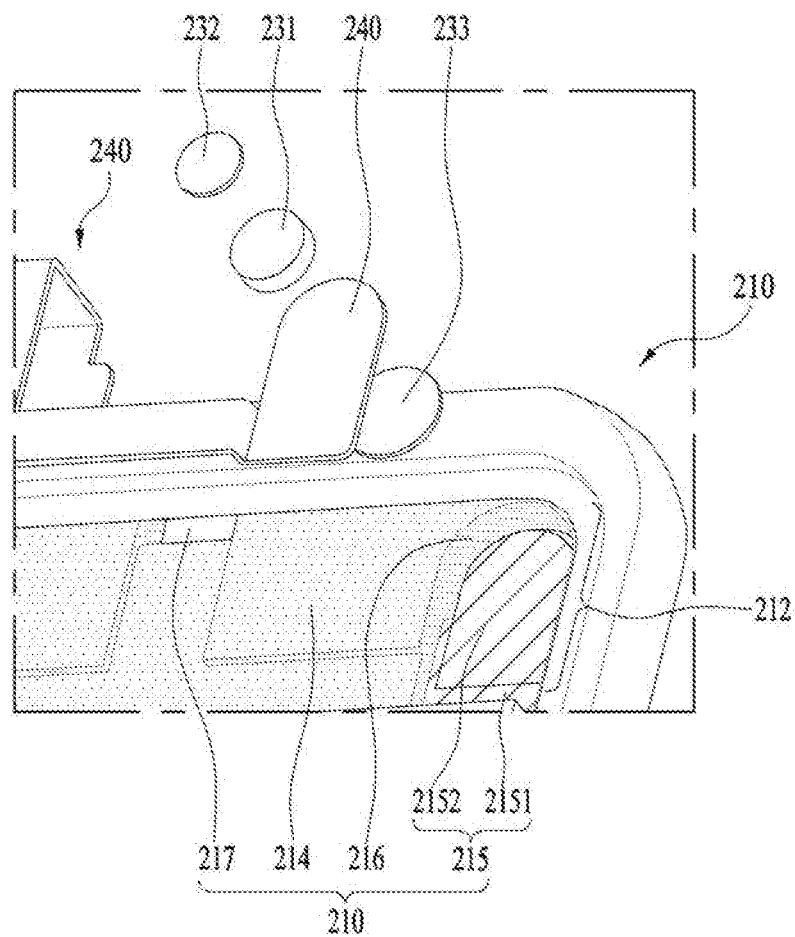
FIG. 3 is an exploded perspective diagram of a front force sensor region of a mobile terminal according to the present invention.

FIG. 3 is an exploded perspective diagram of a region of the front force sensor 231a of the mobile terminal 100 according to the present invention.

Referring to FIG. 3, the front window 220 shown in FIG. 2 and the front force sensor 231 can be fixed to each other by an adhesive pad 232. The adhesive pad 232 may contain an adhesive material. If necessary, the adhesive pad 232 may be formed of a rubber based material having a predetermined restoration force. Through this, it is able to prevent the front force sensor 231 from moving laterally on the backside of the front window 220 shown in FIG. 2.

And, the adhesive pad 232 may further include a conductive material. When the adhesive pad 232 is electrically conductive, if user's touch input is generated from the front window 220 shown in FIG. 2, it may be able to additionally sense that the touch input is applied to the front window 220 shown in FIG. 2 corresponding to the front force sensor 231 by sensing a difference of capacitor.

Figure 4:
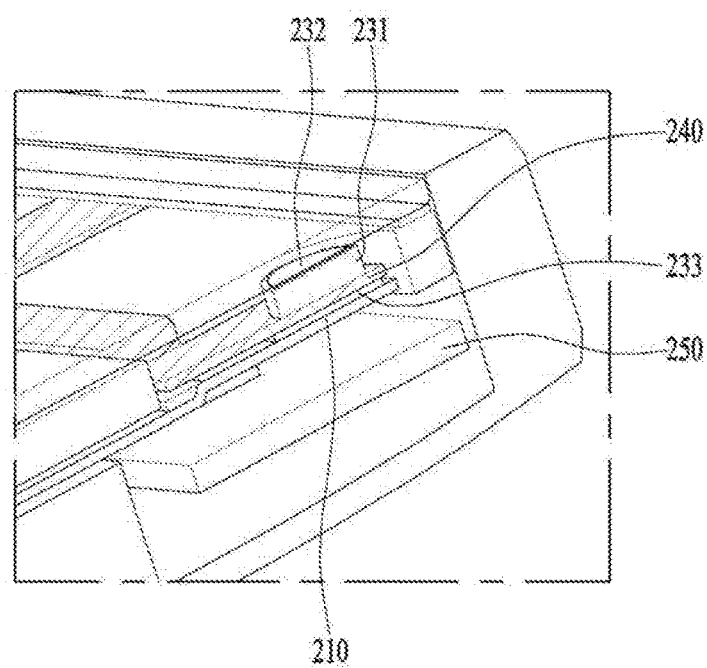
FIG. 4 is a cross-sectional diagram of a mobile terminal in a direction A-A' shown in FIG. 1B.

A flexible PCB 240 configured to deliver a signal generated from a force sensor may be provided to the backside of the front force sensor 231. The flexible PCB 240 may be connected to a main PCB, which is denoted by a reference number 250 shown in FIG. 4, provided to the backside of the support bracket 210. A buffer pad 233 is provided between the flexible PCB 240 and the support bracket 210 to play both a role in buffering a force applied to the front force sensor 231 and a role in delivering the force to the support bracket 210.

At least three front force sensors 231 may be provided. In case that at least three front force sensors 231 are provided, a front force applied to a prescribed point of the front window 220 is delivered to each of the front force sensors 231. In doing so, the elements of the front force applied to the prescribed point may include a location on the front window 220 and a force magnitude. The closer a distance from the front force sensor 231 gets, the stronger the delivered force becomes. The farther a distance from the front force sensor 231 gets, the weaker the delivered force becomes. Since the location on the front window 220 can be functionalized into coordinates on horizontal and vertical axes, the elements supposed to be measured include a location on the horizontal axis, a location on the vertical axis, and a magnitude of a force corresponding to the locations. Hence, in order to determine them, at least three front force sensors 231 are necessary.

The controller 180 can calculate a front force applied point and a magnitude of a force at the front force applied point through the strengths of force signals generated by the at least three front force sensors 231, respectively.

FIG. 4 is a cross-sectional diagram of a mobile terminal in a direction A-A' shown in FIG. 1B.

Referring to FIG. 4, a main PCB 250 on which various parts are mounted may be provided to the backside of the support bracket 210. The parts configured to transceive electric signals are connected to each other through the main PCB 250. The flexible PCB 240 connects a signal generated from the front force sensor 231 provided to the front surface of the support bracket 210 to the main PCB 250 provided to the backside of the support bracket 210.

The flexible PCB 240 may be connected to the main PCB 250 by overstriding the support bracket 210 or by passing through a hole provided to the support bracket 210.

The flexible PCB 240 may be able to connect each of the three sensors separately.

Referring now to FIG. 2, in case that the extension part 212 of the support bracket 210 extends in the top and bottom directions of the mobile terminal 100, the flexible PCB 240 may include a first flexible PCB 2401 and a second flexible PCB 2402, which are disposed in the top and bottom directions as well. In this case, a portion of the at least three front force sensors 231 may be provided to the first flexible PCB 2401 and the rest of the at least three front force sensors 231 except the front force sensor(s) 231 provided to the first flexible PCB 2401 may be provided to the second flexible PCB 2402.

For instance, if two front force sensors 231 are provided to a top end portion of the extension part 212 of the support bracket 210 and one front force sensor 231 is provided to a bottom end portion of the extension part 212, the first flexible PCB 2401 is connected to the main PCB 250 by containing the two front force sensors 231 at the top end portion and the second flexible PCB 2402 is connected to the main PCB 250 by containing one front force sensor 231 at the bottom end portion.

Figure 5:
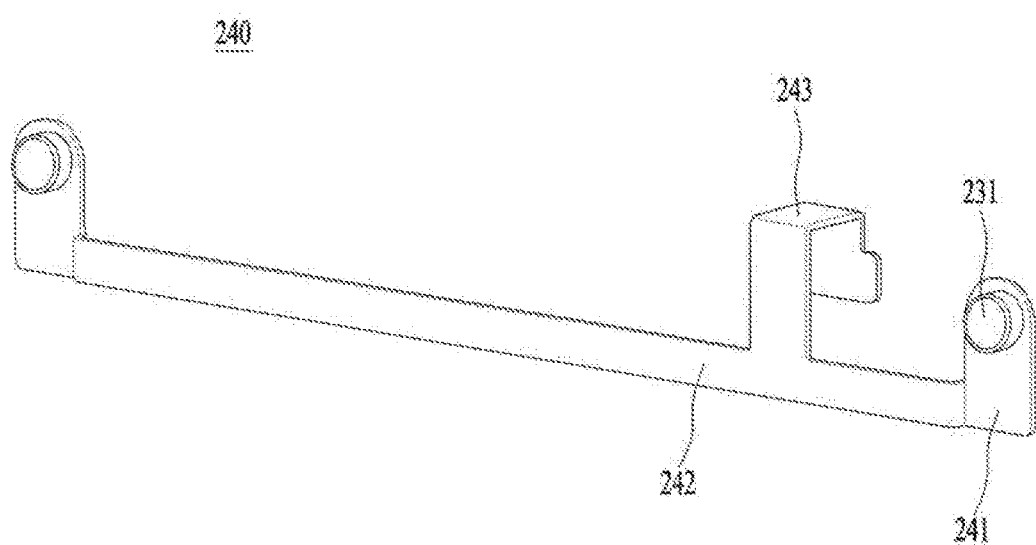
FIG. 5 is a diagram of a flexible PCB according to one embodiment of the present invention.

FIG. 5 is a diagram of a flexible PCB according to one embodiment of the present invention.

Referring to FIG. 5, a front surface of the flexible PCB 240 may include at least one seating surface 241 provided with the front force sensor 231 and a connecting strap 242 connecting the at least one or more seating surfaces 241 together. And, the front surface of the flexible PCB 240 may include a bent strap 243 configured to overstride a rear surface of the flexible PCB 240 by diverging from a prescribed point of the connecting strap 242.

The seating surface 241 of the front surface of the flexible PCB 240, on which the front force sensor 231 is mounted, may be provided to come in contact with the support bracket 210 shown in FIG. 4. And, the connecting strap 242 configured to connect the seating surface 241 may be configured not to directly contact with the support bracket 210 shown in FIG. 4 by having a step difference from the seating surface 241 in a manner of being projected in a front direction. As the connecting strap 242 is spaced apart from the support bracket 210 shown in FIG. 4 by a predetermined space instead of directly contacting with the support bracket 210 shown in FIG. 4, when a front force is generated, the connecting strap 242 presses the support bracket 210 shown in FIG. 4 so as to prevent noise from being generated from a force measured by the front force sensor 231.

In case that the front force sensor 231 is provided near an outer vertex of the front window 220, since the connecting strap 242 needs to be provided in a manner of inclining toward an inside of the mobile terminal 100 as far as possible, the seating surface 241 and the connecting strap 241 of the flexible PCB 240 can has a bent-inward shape like '⊏'.

Referring now to FIG. 2, the front force sensor 231 can be provided adjacent to a vertex of the front window 220.

A partial region of an edge of the display unit 151 and a partial region of the extension part 212 of the support bracket 210 can be coupled with the front window 220 through a tape 260 or a combination of the tape 260 and a pad. In case of the coupling using the tape 260 or the combination of the tape 260 and the pad, when a prescribed point of the window 220 is pressed, a compression of the window 220 is available. Hence, the coupling using the tape 260 or the combination of the tape 260 and the pad can deliver a further subdivided force to the front force sensor 231 than a coupling using a bonding system.

Figure 6:
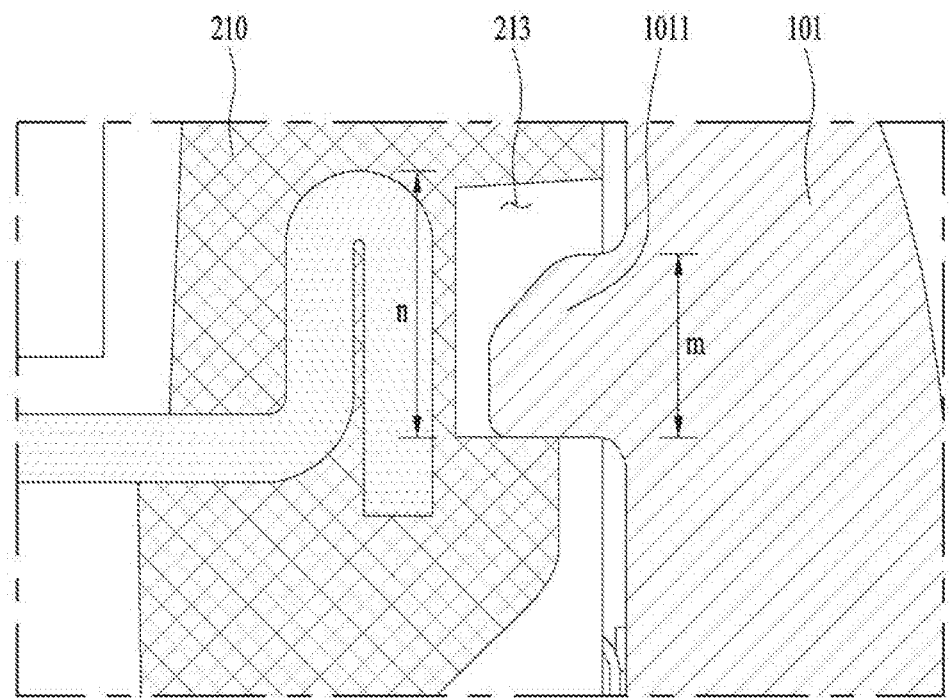
FIG. 6 is a cross-sectional diagram of a mobile terminal in a direction A-A' shown in FIG. 1B.

FIG. 6 is a cross-sectional diagram of a mobile terminal in a direction A-A' shown in FIG. 1B.

Referring to FIG. 6, the support bracket 210 can be fixed to a lateral surface of the front case 101 of the mobile terminal 100 through a lock system of a hook 1011. Through the lock system of the hook 1011, it is able to prevent the support bracket 210 from being unintentionally removed or separated.

When a force is delivered to the support bracket 210 by a force generated from a prescribed point of the front window 220, if the support bracket 210 is configured to sag, a force supposed to be received by a sensor can be distributively delivered to the support bracket 210. Hence, the front force sensor 231 can receive a relatively subdivided force.

When the support bracket 210 is locked by the hook 1011 of the front case 101, in order to enable the support bracket 210 to sag by a vertically downward force, a thickness n of a recess portion 213 of the support bracket 210 locked to the hook 1011 of the front case 101 can be greater than a thickness m of the hook 1011.

Before the support bracket 210 sags by a force applied in a vertically downward direction, the hook 1011 of the front case 101 may be located below the recess portion 213 of the support bracket 210. If a force is applied to the support bracket 210 in a vertically downward direction, the hook 1011 of the front case 101 may be located above the recess portion 213 of the support bracket 210.

Referring now to FIG. 3, the support bracket 210 may include a front support part 214 configured not to be displaced by a front force and a front tilting part 215 configured to be displaced by a front force, depending on whether the support bracket 210 moves. One side region of the front tilting part 215 is connected to a first region 2151 of the front support part 214, thereby playing a role in that a second region 2152 except the one side region 2151 can sag. When the front force sensor 231 receives a force from the front window 220, the front tilting part 215 is configured to sag by a predetermined displacement. Hence, as a subdivided force is delivered to the front force sensor 231, sensing sensitivity can be raised.

The front support part 214 and the front tilting part 215 of the support bracket can be provided in the same plane. In this case, the second region 2152 between the front support part 214 and the front tilting part 215 except the first region 2151 connecting the front support part 214 and the front tilting part 215 may have a front slit 216. Although the front support part 214 and the front tilting part 215 exist in the same plane, the front tilting part 215 can make a sagging movement through the front slit 216. The front tilting part 215 may be configured with a metal plate. And, the support part 211 at which the backside of the display unit 151 corresponding to a portion of the front support part 214 can be also configured with a metal plate together with the front tilting part 215.

A region of the support bracket 210 except the metal plate may be formed of synthetic resin such as poly carbonate by molding. Since the flexible PCB may contact with and pass through the corresponding region, the corresponding region needs to be formed of a non-conductive material. Since the corresponding region may need appropriate rigidity in being coupled with the front case 101, the corresponding region may be formed of synthetic resin such as poly carbonate.

The molding formed region may include a step difference part 217 configured to provide a hole to enable the aforementioned flexible PCB 240 to pass through and overstride the rear surface or a guide for the flexible PCB 240 to overstride.

Figure 7:
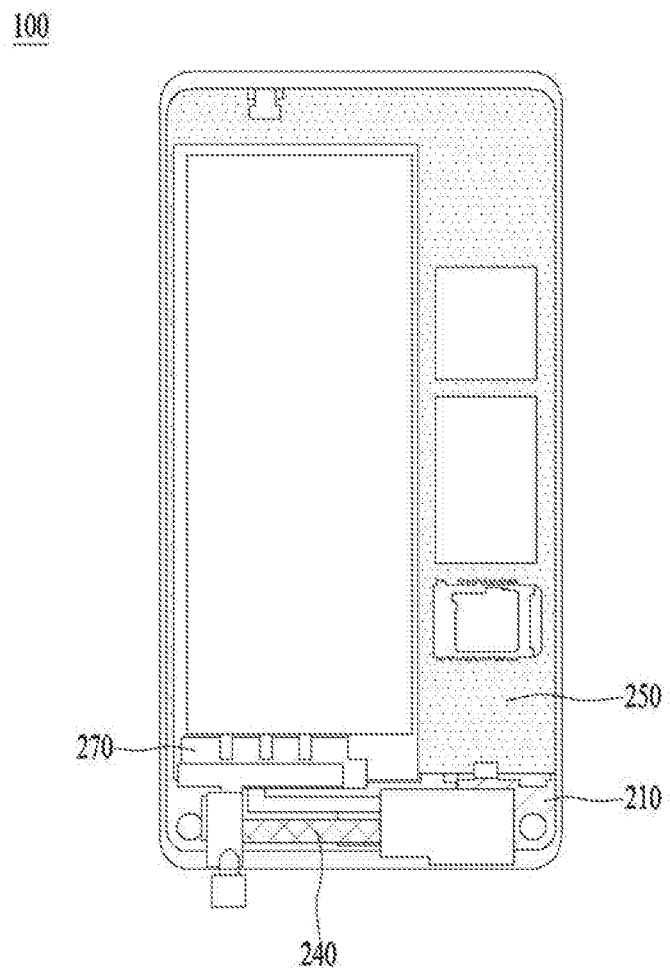
FIG. 7 is a diagram of a rear side of a mobile terminal except a rear case according to the present invention.

FIG. 7 is a diagram of a rear side of the mobile terminal 100 except a rear case according to the present invention.

Referring to FIG. 7, a driving unit 270 can deliver vibration to the front window 220 or a whole housing of the mobile terminal 100 including the front window 220. Particularly, if a force is sensed by the front force sensor 231 shown in FIG. 2, the driving unit 270 can play a role in feeding back the sensed force under the controller 180 shown in FIG. 1A.

The driving unit 270 can generate vibration in different size according to a signal of current. The controller 180 shown in FIG. 1A can control vibration in different size to be generated in proportion to a magnitude of the force sensed by the front force sensor 231. When a user presses the front window 220, the user can receive a feedback in a manner of recognizing a strength level of the pressing in accordance with a level of the vibration of the driving unit 270.

The driving unit 270 may be provided in a manner of forming an additional region in the flexible PCB 240 having the front force sensor 231 (shown in FIG. 2) connected thereto. Alternatively, the driving unit 270 may be individually connected to the main PCB 250.

If the driving unit 270 is provided in a manner of forming the additional region in the flexible PCB 240 having the front force sensor 231 connected thereto, the driving unit 270 may be inevitably provided in a manner of inclining in a direction in which the connected flexible PCB 240 is located.

Figure 8:
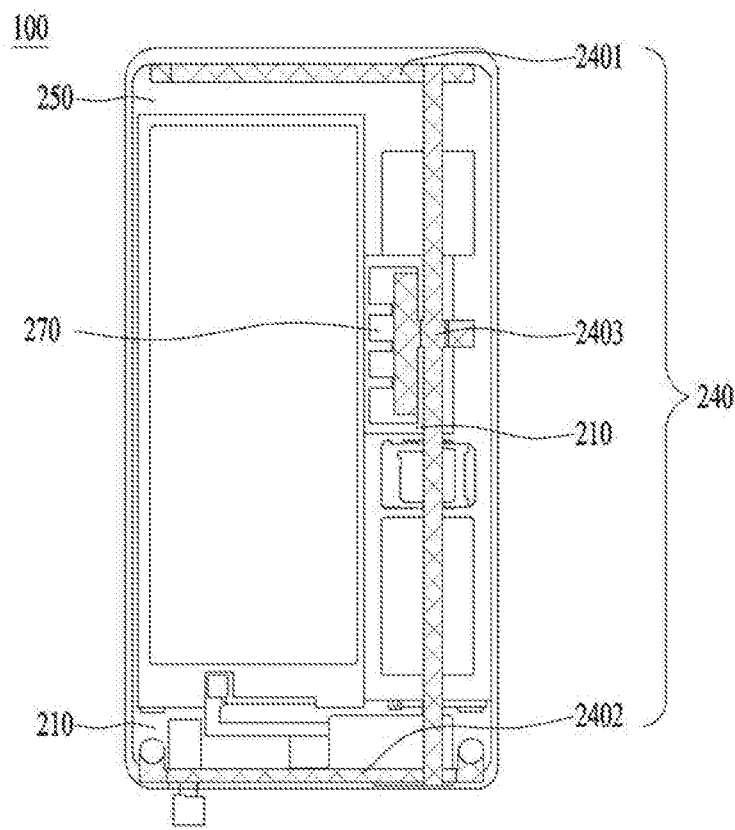
FIG. 8 and FIG. 9 are diagrams of a driving unit installed mobile terminal according to one embodiment of the present invention, respectively.
Figure 9:
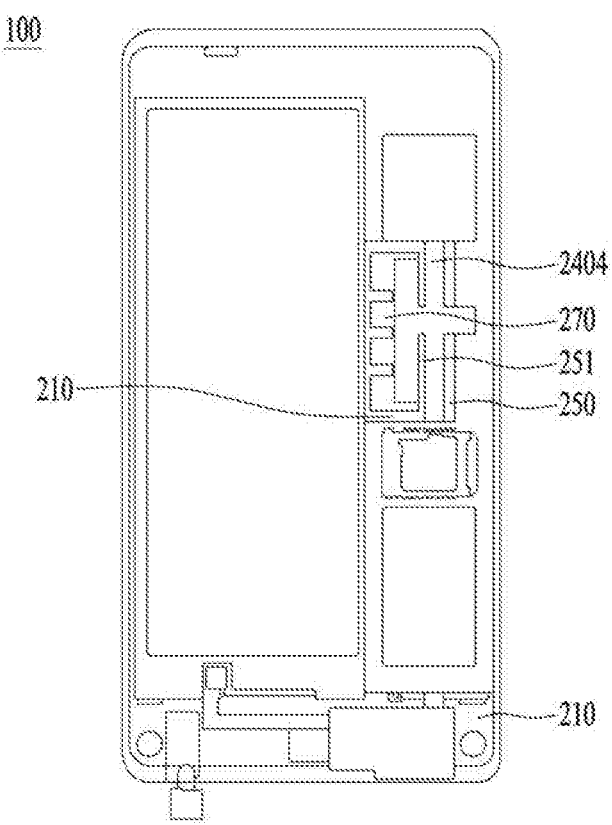

FIG. 8 and FIG. 9 are diagrams of the driving unit 270 installed in the mobile terminal 100 according to one embodiment of the present invention, respectively.

Referring to FIG. 8 and FIG. 9, the driving unit 270 may be disposed at a central part of the mobile terminal 100 to deliver even vibration to a whole region of the front window 720. In case that the driving unit 270 is disposed at the central part of the mobile terminal 100, it can be provided to a backside of the main PCB 250. In this case, a third flexible PCB 2403 may be additionally provided to vertically connect the first flexible PCB 2401 and the second flexible PCB 2402 together. Moreover, a fourth flexible PCB 2404 may be separately provided in a manner of being connected to the main PCB 250.

In order to intensively deliver vibration to the front window 220, a central part of the main PCB 250 may include an opening 251 to mount the driving unit 270 thereon. In case that the opening 251 of the main PCB 250 is formed, the support bracket 210 is exposed to a rear surface and the driving unit 270 is seated on an exposed region of the support bracket 210, whereby vibration can be directly delivered to the support bracket 210.

In case that the driving unit 270 is disposed at the central part of the mobile terminal 100, it can have relatively more margin in mounting parts of top and bottom sides than the case of connecting to the first flexible PCB 2401 or the second flexible PCB 2402. Hence, it is advantageous in securing a resonant space of a speaker provided to one side.

Figure 10:
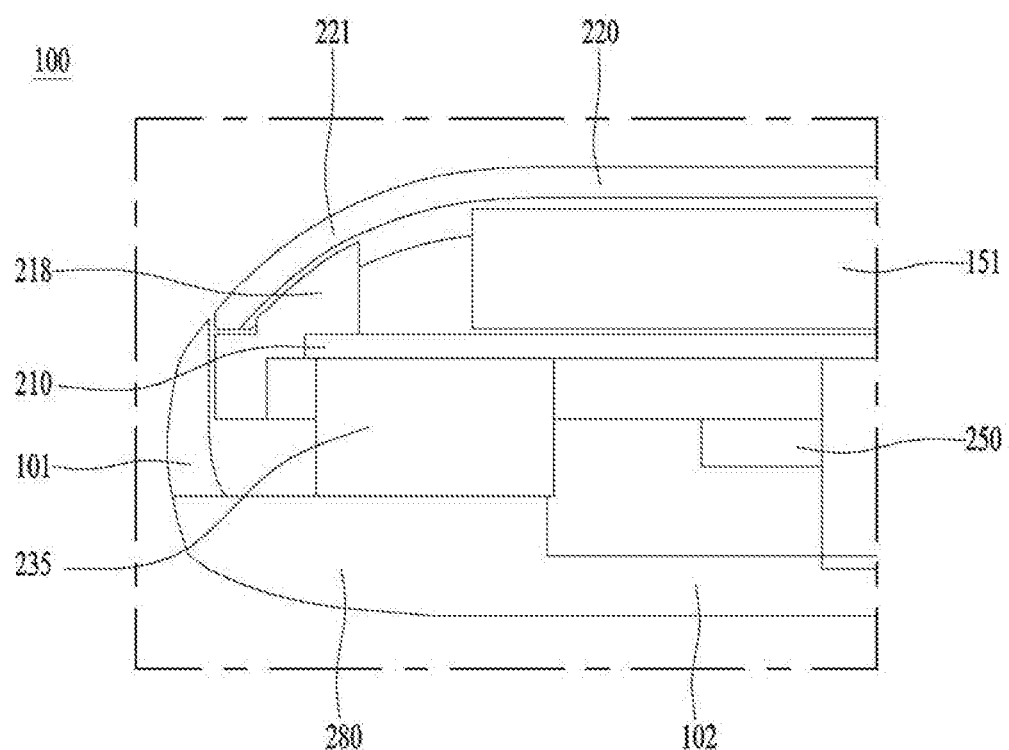
FIG. 10 is a cross-sectional diagram of a mobile terminal including a front window of which edge has a curved part according to one embodiment of the present invention.

FIG. 10 is a cross-sectional diagram of the mobile terminal 100 including the front window 220, of which edge has a curved part 221, according to one embodiment of the present invention.

Referring to FIG. 10, the front window 220 may further include the curved part 221 having a curved edge of at least one side. In this case, the display unit 151 may have a planar shape irrespective of a shape of the front window 220 or may include the display unit 151 having the curved part curved with the same tendency of the shape of the front window 220.

A sensor configured to sense a force applied to a second point of the curved part 221, i.e., a force input is defined as a lateral force sensor 235. If the lateral force sensor 235 is disposed in parallel right below the curved part 221 of the front window 220 like the front force sensor 231 shown in FIG. 3, the lateral force sensor 235 is disposed in a manner of inclining to the support bracket 210. Such an inclining disposition fails to provide a stable disposition and may have an insufficient space for installation due to a curved shape of the curved part 221. Hence, the lateral force sensor 235 may be provided in parallel with the backside of the support bracket 210.

A space between the edge region of one side having the curved part 221 and the support bracket 210 is charged with a charged mold part 218, whereby a force applied to the second point of the curved part 221 in the lateral or diagonal direction can be delivered as a vertical force to the support bracket 210. To implement this, one side of the charged mold part 218 comes in contact with the front window 220 or the display unit 151, while the other side may come in contact with or be connected to the support bracket 210.

A rear bracket 280 is provided to a rear surface of the lateral force sensor 235, thereby playing a role in supporting the lateral force sensor 235 to receive a force. The rear bracket 280 may be configured with a member separate from the rear case 102 configuring a rear exterior of the mobile terminal 100. Alternatively, the rear case 102 forms a region having a step difference, thereby configuring a part of the rear bracket 280.

Moreover, at least two lateral force sensors 235 may be provided per edge of the window 220 having the curved part 221. In case that one lateral force sensor 235 is provided per edge, it may be difficult to accurately determine a position and magnitude of a force applied to the corresponding edge. If the lateral force sensors 235 are provided to both sides of the corresponding edge in a manner of being separated from each other, the controller 180 shown in FIG. 1a can accurately compute the position and magnitude of the force applied to a prescribed point of the corresponding edge.

Figure 11:
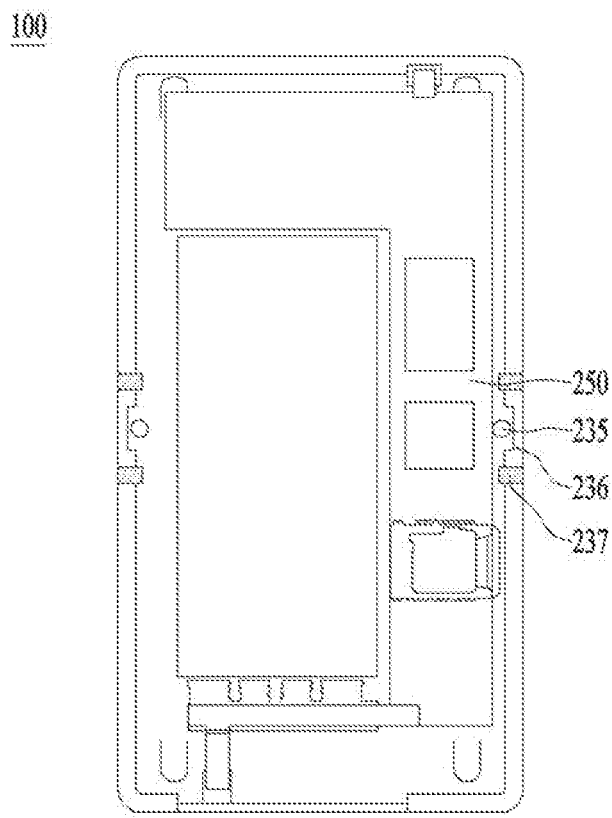
FIG. 11 is a diagram of a mobile terminal according to one embodiment of the present invention.

FIG. 11 is a diagram of the mobile terminal 100 according to one embodiment of the present invention.

Referring to FIG. 11, for the purpose similar to that of the front tilting part 215 applied to the front force sensor 231, the support bracket 210 can form a lateral tilting part 236 in a manner that a lateral slit 237 is provided to each of both sides of a region corresponding to the lateral force sensor 235. Yet, unlike the front tilting part 215 configured to raise the sensitivity of the front force sensor 231 by being curved more than a neighbor region, the lateral tilting part 236 can raise the sensitivity of the rear force sensor 235 by being curved less than the neighbor region.

The charged mold part 218 may have a width up to a region corresponding to the lateral force sensor 235. In this case, a force applied in a lateral or diagonal direction can be directly delivered to the lateral force sensor 235, whereby sensitivity can be raised.

Figure 12:
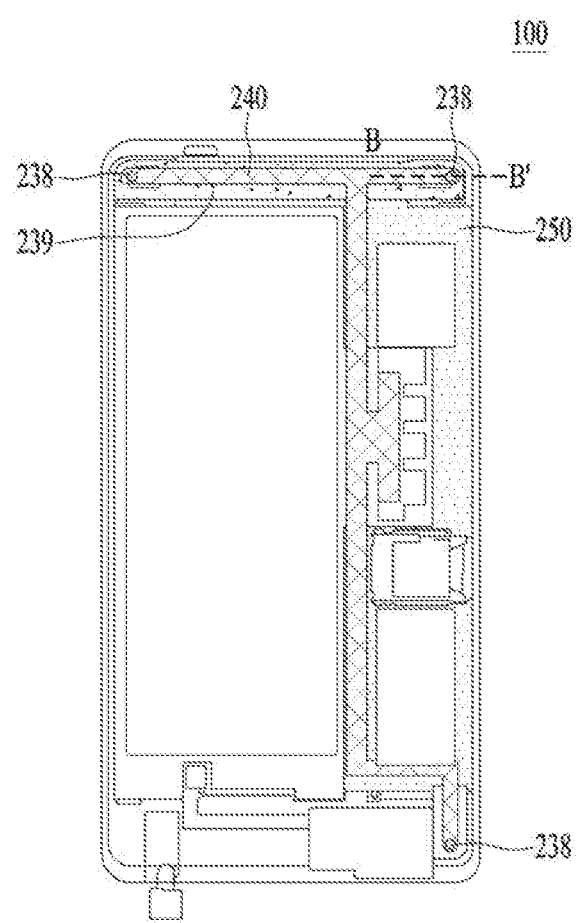
FIG. 12 is a diagram of a rear side of a mobile terminal having a rear force sensor except a rear housing according to the present invention.

FIG. 12 is a diagram of a rear surface of the mobile terminal 100 having a rear force sensor 238 except a rear housing according to the present invention.

Figure 13:
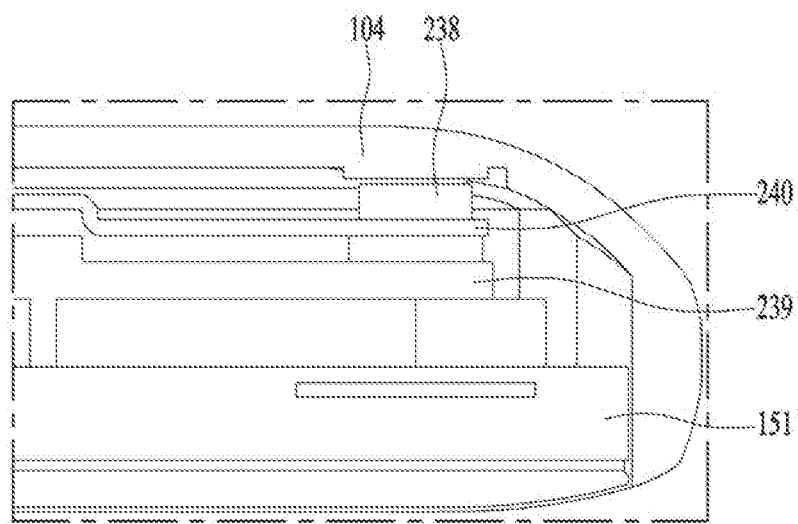
FIG. 13 is a cross-sectional diagram in a direction B-B' including a rear housing shown in FIG. 12.

Referring to FIG. 12, the rear force sensor 238 may be provided within a rear housing 104 shown in FIG. 13. A type of the rear force sensor 238 may be equal to that of the front force sensor 231 shown in FIG. 2. And, the rear force sensor 238 may differ from the front force sensor 231 shown in FIG. 2 in generating a signal by recognizing a force applied to the rear housing 104 shown in FIG. 13, i.e., a force input.

The rear housing 104 shown in FIG. 13 indicates a member configured to form an exterior by being located at an most outer region of the rear surface of the mobile terminal and to have an external force delivered thereto directly. In case of a battery built-in mobile terminal, the rear housing 104 shown in FIG. 13 may become the rear case 102. In case of a battery replaceable mobile terminal, the rear housing 104 shown in FIG. 13 may become the battery cover 103.

Like the front force sensor 231 shown in FIG. 2, the rear force sensor 238 may be provided in a manner of inclining near an outer vertex of the mobile terminal 100 or may be connected to the main PCB 250 through the flexible PCB 240.

The rear force sensor 238 can generate a rear force signal by receiving a rear force applied to a prescribed point of the rear housing 104 shown in FIG. 13. The controller 180 shown in FIG. 1A can measure a force applied point and a force magnitude through the force signal generated by each rear force sensor 238.

FIG. 13 is a cross-sectional diagram in a direction B-B' including the rear housing 104 shown in FIG. 12.

Referring to FIG. 13, in order for the rear force sensor 238 to sense a force applied to the rear housing 104, the rear force sensor 238 needs to be provided in a manner of coming in contact with the rear housing 140. An extension bracket 239 includes and enables the rear force sensor to come in contact with the rear housing 140. The extension bracket 239 can play a role in charging a backside space between the main PCB 250 and the rear housing 140.

Figure 14:
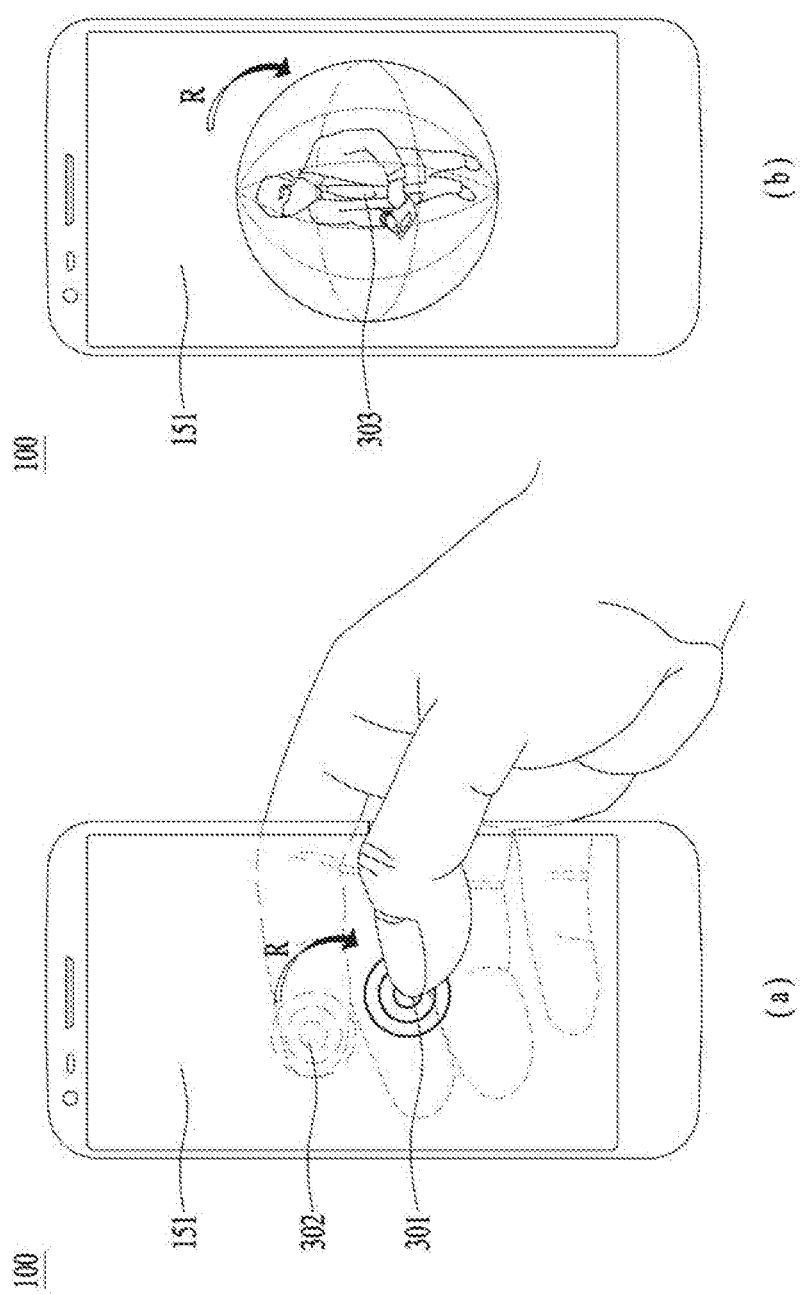
FIG. 14 is a diagram for one example of applying a force to a mobile terminal according to one embodiment of the present invention.

FIG. 14 is a diagram for one example of applying a force to a mobile terminal according to one embodiment of the present invention.

Referring to FIG. 14, in case that both of the front force sensor 231 and the rear force sensor are simultaneously provided, a force applied to the mobile terminal 100 can be analyzed 3-dimensionally. For instance, when a user grabs the mobile terminal 100 with fingers, the user may press a front left top of the mobile terminal 100 with one finger 301 and may also press a rear right bottom of the mobile terminal 100 with another finger 302. The controller 180 shown in FIG. 1A can recognize a pattern of the corresponding force as an input for a turning force in a direction R. For example of a corresponding effect, while a 3D image is outputted through the display unit 151, it is able to rotate the 3D image 303 in the recognized direction R.

In the following description, one example of applying an input by a force sensor to a video shot and play application is explained.

The aforementioned force generated from a specific point on the mobile terminal can be construed as the same meaning of a force input mentioned in the following description.

Figure 15:
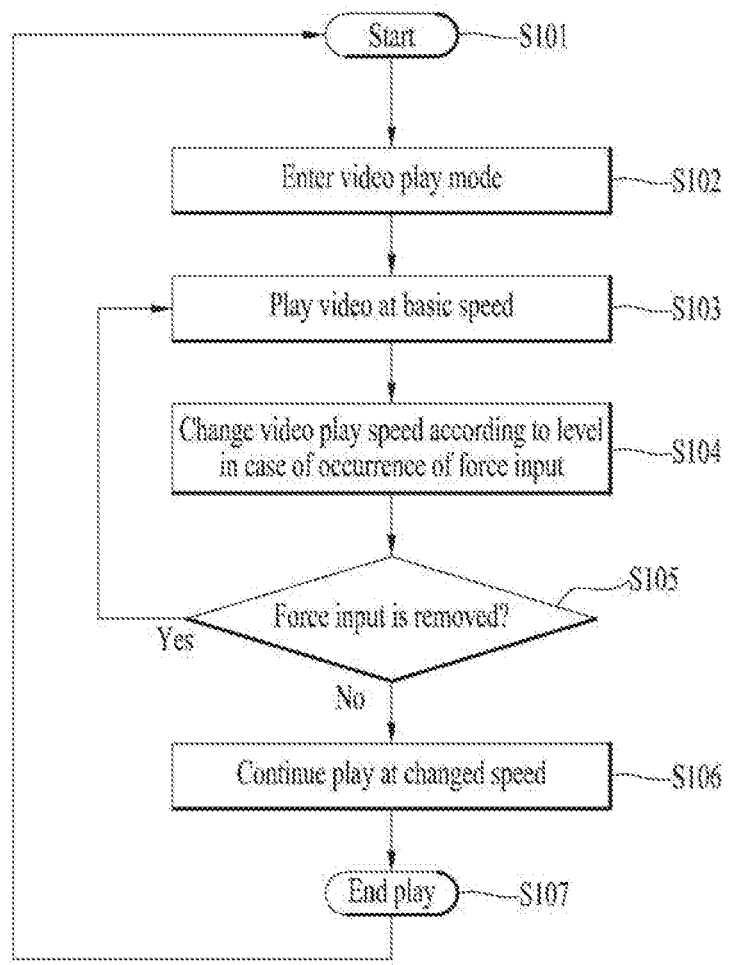
FIG. 15 is a flowchart for one example of applying a force input signal by a force sensor to a video play according to one embodiment of the present invention.

FIG. 15 is a flowchart for one example of applying a force input signal by a force sensor to a video play according to one embodiment of the present invention.

Referring to FIG. 15, when a video is played, the controller divides a play speed into levels according to magnitudes of forces measured by the force sensor and is then able to perform a play according to each of the levels. For instance, the measured forces can be divided into first to third levels in order of an increasing force from a state of none of an applied force.

The play speed may be set to increase from 1×, 2× and 4× according to the forces of the first to third levels, respectively. If a video play mode is entered [S102], the video can be played at 1× corresponding to the first level that is a basic speed [S103]. As a force is further applied, the video can be played fast at a speed corresponding to the second or third level [S104]. If the force corresponding to the second lv or the third level is removed, the video can be played at the previous speed by returning to the play speed of the first level [S103]. So to speak, while the play speed increases in proportion to a strength of a force input, if the force input is removed, the video can played at the previous play speed.

On the contrary, it may set the video to be played at a speed decreasing according to the forces of the first to third levels. In particular, the video can be played at the speed of 1×, 0.5×, or 0.25×. Hence, while the video is played at 1× corresponding to the first level, if a force corresponding to the third level is applied, the video may be paled at the speed of 0.25× [S104]. So to speak, while the play speed decreases in proportion to a strength of a force input, if the force input is removed, the video can played at the previous play speed.

Figure 16:
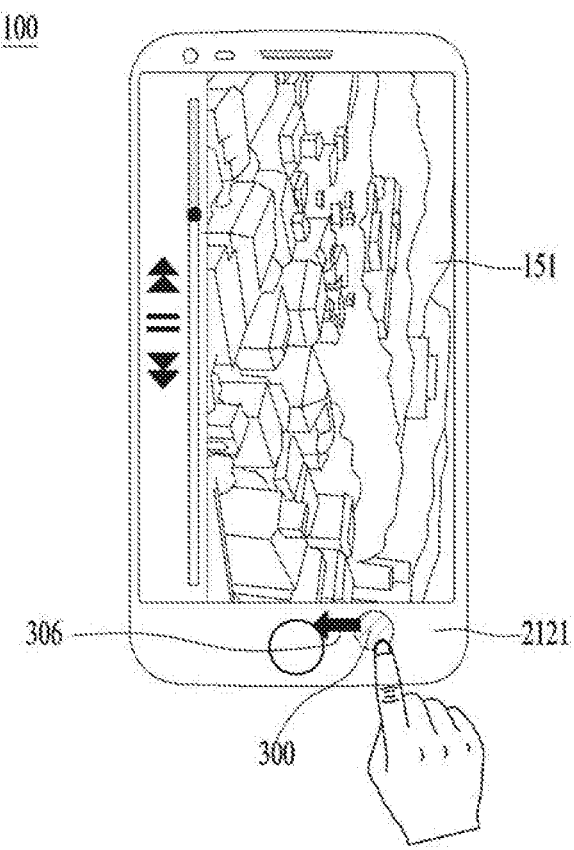
FIG. 16 is a diagram for one example of applying a force input signal by a force sensor to a video play according to one embodiment of the present invention.

FIG. 16 is a diagram for one example of applying a force input signal by a force sensor to a video play according to one embodiment of the present invention.

Referring to FIG. 16, it is able to adjust a video play position according to a force input drag 306 that can be simultaneously generated together with a force input 300 for controlling a play speed by dividing it into levels. For instance, it is able to decrease a video play speed by pressing a predetermined point. While a video is played at a slow speed by applying a force of a third level, if a force input drag 306 is generated in a left direction, it is also able to perform a rewind function. If a force input drag 306 is generated in a right direction, a fast forward function can be simultaneously performed. For instance, in case that a force drag input 306 in a right direction is generated in a state that the force input 300 corresponds to the third level, the fast forward function can be performed in the course of playing the video at a slow speed.

In doing so, the force input 300 or the force input drag 306 may be generated from a region 2121 other than the display unit 151. Since a user input by a touch input or the like may be already activated within the display unit 151, it is able to prevent an erroneous input unintended by a user from being generated due to a confusion with the touch input through the force input 300 or the force input drag 306.

Figure 17:
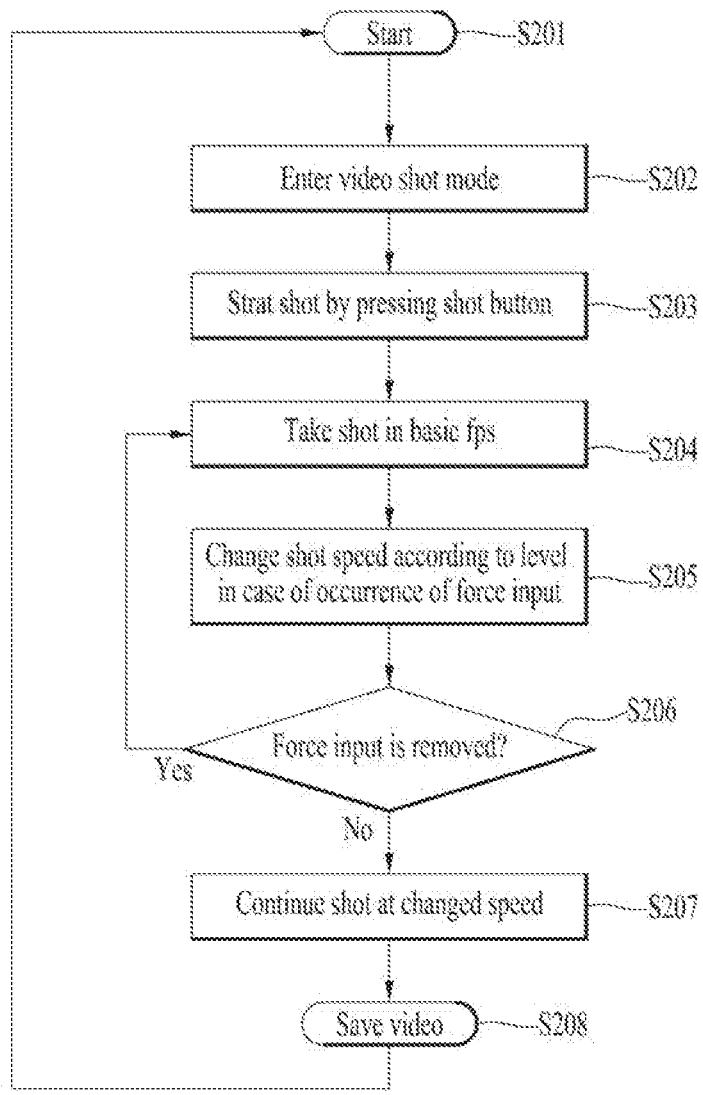
FIG. 17 is a flowchart for one example of applying a force input signal by a force sensor to a video shot according to one embodiment of the present invention.

FIG. 17 is a flowchart for one example of applying a force input signal by a force sensor to a video shot according to one embodiment of the present invention.

Referring to FIG. 17, when a video shot is performed, the controller divides a shot speed into levels according to magnitudes of forces measured by the force sensor and is then able to perform the video shot according to each of the levels. For instance, the measured forces can be divided into first to third levels in order of an increasing force from a state of none of an applied force. It is able to create frames of 24 fps, 60 fps and 240 fps according to the forces of the first to third levels, respectively. After a video shot mode has been entered [S202], if a video shot is initiated by pressing a shot button [S203], the corresponding shot proceeds in a basic fps [S204]. It is able to create a video in 24 fps corresponding to a basic shot frame speed of first level. If a force input corresponding to a force of a third level is applied, it is able to create the video in 240 fps [S205]. If the force corresponding to the third level is removed, it is able to create a video of frames corresponding to 24 fps again [S204]. So to speak, while a frame-per-second created speed increases in proportion to a strength of a force input, if the force input is removed, it is able to create a video at a previous frame-per-second created speed.

It may be able to adjust an amount of light outputted from an optical output unit according to a strength of a force input. If a specific icon provided to the display unit 151 shown in FIG. 1B is selected, the controller 180 shown in FIG. 1A can control the flash 124 shown in FIG. 1B to project light used for an image or video shot. Thereafter, if a force input to the specific icon increases, the controller 180 shown in FIG. 1A can increase an amount of light projected by the flash 124 shown in FIG. 1B. If the force input is removed, the controller 180 shown in FIG. 1A can control the flash 124 shown in FIG. 1B to project a previous amount of light.

Figure 18:
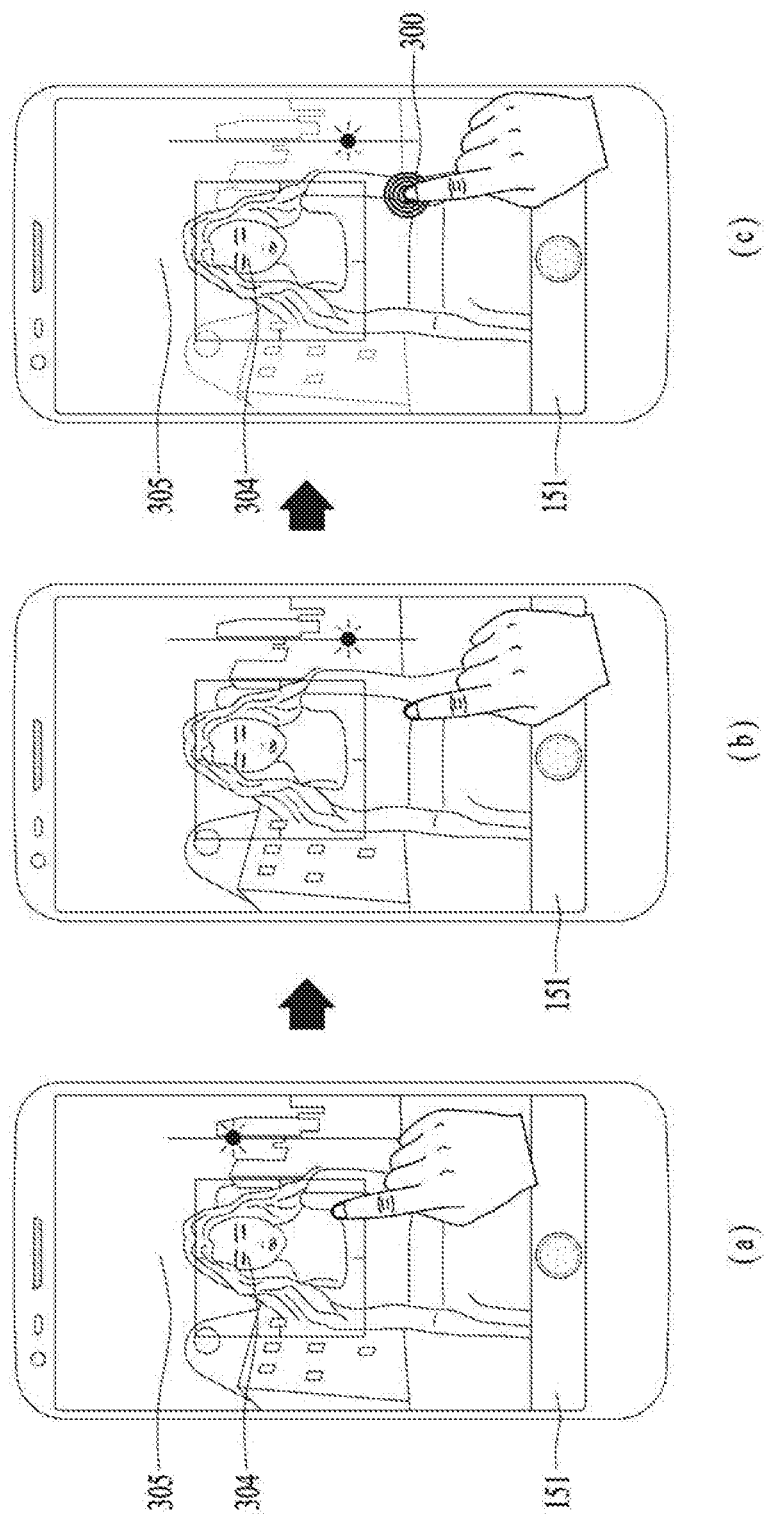
FIG. 18 is a diagram for one example of applying a force input signal by a force sensor to an image shot according to one embodiment of the present invention.

FIG. 18 is a diagram for one example of applying a force input signal by a force sensor to an image shot according to one embodiment of the present invention.

Referring to FIG. 18(a), in taking an image shot, if a target 304 is touched, a focus can be adjusted to fit a distance from the target 304.

Referring to FIG. 18(b), while the touch 304 is touched, if a touch drag in a specific direction is generated, it is able to control a brightness, i.e., a white balance to be adjusted.

Referring to FIG. 18(c), while the corresponding touch is maintained, if a force input 300 is generated, it can bring a blurring effect of further blurring the background 305 except the target 304 in the adjusted focus. In this case, it is able to obtain the depth emphasized more than a depth effect caused by the focus adjustment. If the force input 300 is removed, the emphasized depth can return to a previous depth.

Various embodiments have been described in the best mode for carrying out the invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A mobile terminal, comprising:
a display unit configured to display information;
a support bracket including a support part configured to directly support a rear side of the display unit and cover an entire portion of the rear side of the display unit and an extension part formed as one body with the support part and extending laterally from the support part, the extension part being exposed when the display unit is disposed on the support part;
a front window coupled with a front surface of the display unit and the extension part, the front window including a rigid material;
at least three front sensors located between the front window and the extension part of the support bracket and attached on a rear surface of the front window to receive a front force applied to a specific point on the front surface of the front window, the at least three front sensors simultaneously generating front force signals having different strengths respectively according to distances between the at least three sensors and the specific point, in response to the applied front force; and
a controller determining the specific point and a magnitude of the front force based on the strengths of the front force signals generated by the at least three front sensors.

2. The mobile terminal of claim 1, further comprising:
a main printed circuit board (PCB) on a rear side of the support bracket; and
a flexible printed circuit board (PCB) provided to a backside of each of the at least three front sensors, the flexible PCB connected to the main PCB and including a first flexible PCB and a second flexible PCB each including at least one of the at least three front sensors.

3. The mobile terminal of claim 2, wherein:
the flexible PCB further includes a seating surface on which each of the at least three front sensors are located; and
the mobile terminal further includes a buffer pad provided between the flexible PCB and the support bracket and an adhesive pad provided between the front window and each of the at least three front sensors in order to fix a location thereof, wherein the buffer pad is located between the seating surface of the flexible PCB and the support bracket.

4. The mobile terminal of claim 3, wherein the adhesive pad includes a conductive material configured to recognize a touch input generated on the front surface of the front window.

5. The mobile terminal of claim 1, wherein the at least three front sensors are provided adjacent to a vertex of the front window.

6. The mobile terminal of claim 1, further comprising tape bonding an edge of the front window and an edge of the extension part.

7. The mobile terminal of claim 1, wherein the support bracket further includes:
a front support portion that is not displaced in response to the front force; and
a front tilting portion connected to a first region of the front support portion, the front tilting portion displaced in response to the front force.

8. The mobile terminal of claim 7, wherein
the front support portion and the front tilting portion are located in a same plane; and
the mobile terminal further comprises a front slit at a region between the front support portion and the front tilting portion.

9. The mobile terminal of claim 8, wherein:
the front tilting portion includes a metal material; and
the front slit is configured by at least one partial region of the front support portion that includes a molded polycarbonate material.

10. The mobile terminal of claim 1, further comprising a driving unit configured to generate vibration that is provided to the front window, wherein the controller controls the driving unit to vibrate when the force is generated.

11. The mobile terminal of claim 10, further comprising:
a main printed circuit board (PCB) on a rear side of the support bracket; and
an opening formed in the main PCB to expose a portion of the rear side of the support bracket therethrough, wherein the driving unit is installed in the opening.

12. The mobile terminal of claim 1, wherein the front window comprises:
a curved portion having a curved edge on at least one side;
a molded portion charging a space between the curved portion and the support bracket, the molded portion configured to apply a lateral force to a specific point of the curved portion as a vertical force to the support bracket;

at least one lateral sensor on a rear surface of the support bracket, the at least one lateral sensor configured to generate a lateral force signal in response to the vertical force; and a rear bracket on a rear surface of the at least one lateral sensor, the rear bracket configured to support the at least one lateral sensor.

13. The mobile terminal of claim 12, further comprising two lateral sensors on both sides of the curved edge, wherein the controller determines a point from which the lateral force is generated and a magnitude of the generated lateral force based on a lateral force magnitude signal generated by each of the two lateral sensors.

14. The mobile terminal of claim 12, further comprising a lateral slit on both sides of a region of the support bracket corresponding to the at least one lateral sensor.

15. The mobile terminal of claim 1, further comprising:
a rear housing;
at least three rear sensors within the rear housing each of the at least three rear sensors generating a rear force signal in response to a rear force applied to a specific point of the rear housing; and an extension bracket configured to charge a rear side space of each of the at least three rear sensors in order to enable the at least three rear sensors and the rear housing to contact each other, wherein the controller determines the specific point and a magnitude of the rear force based on the rear force signal generated by each of the at least three rear sensors.

16. The mobile terminal of claim 1, wherein the front window directly faces the display unit.

17. The mobile terminal of claim 1, wherein the support part and the extension part are placed in a common plane.

* * * * *